United States Patent
Suzuki (10) Patent No.: US 10,116,235 B2
(45) Date of Patent: Oct. 30, 2018

(54) POWER CONVERSION APPARATUS

(71) Applicant: DENSO CORPORATION, Kariya, Aichi-pref. (JP)

(72) Inventor: Takashi Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/624,561

(22) Filed: Jun. 15, 2017

(65) Prior Publication Data

US 2017/0366101 A1  Dec. 21, 2017

(30) Foreign Application Priority Data

Jun. 17, 2016  (JP) .................................. 2016-120649

(51) Int. Cl.
| | |
|---|---|
| *H02M 7/48* | (2007.01) |
| *H02P 27/06* | (2006.01) |
| *H02M 7/487* | (2007.01) |
| *H02P 21/22* | (2016.01) |
| *H02M 7/5395* | (2006.01) |
| *H02P 6/16* | (2016.01) |
| *H02P 21/00* | (2016.01) |
| *B62D 5/04* | (2006.01) |

(52) U.S. Cl.
CPC ......... *H02M 7/487* (2013.01); *H02M 7/5395* (2013.01); *H02P 6/16* (2013.01); *H02P 21/0003* (2013.01); *H02P 21/22* (2016.02); *B60Y 2400/61* (2013.01); *B62D 5/0412* (2013.01)

(58) Field of Classification Search
USPC ......................................... 318/430–434, 504
See application file for complete search history.

(56) References Cited

U.S. PATENT DOCUMENTS

| | | | | |
|---|---|---|---|---|
| 5,206,575 A | * | 4/1993 | Nakamura | ............... H02P 27/08 318/807 |
| 7,288,924 B2 | * | 10/2007 | Trandafir | ............... H02M 3/157 323/283 |
| 2002/0191423 A1 | * | 12/2002 | Odachi | ................... H02M 7/48 363/37 |
| 2007/0229004 A1 | * | 10/2007 | Fukamizu | .......... G11B 19/2054 318/400.26 |
| 2012/0139461 A1 | | 6/2012 | Suzuki et al. | |

FOREIGN PATENT DOCUMENTS

| | | |
|---|---|---|
| JP | 2012-125022 A | 6/2012 |
| JP | 2017-112766 | 6/2017 |

* cited by examiner

*Primary Examiner* — Bentsu Ro
(74) *Attorney, Agent, or Firm* — Knobbe, Martens, Olson & Bear, LLP (57) ABSTRACT

A modulation processing unit performs a down-shift process or an up-shift process. In the down-shift process, a neutral-point voltage is shifted towards a low voltage side such that a smallest phase voltage command value is a lower fixed value that is a first lower limit value or a second lower limit value. In the up-shift process, the neutral-point voltage is shifted towards a high voltage side such that a largest phase voltage command value is an upper fixed value that is a first upper limit value or a second upper limit value. The modulation processing unit selects either of a first fixed value, being the first lower limit value or the first upper limit value, and a second fixed value, being the second lower limit value or the second upper limit value, based on a difference between the phase voltage command values in the down-shift process or the up-shift process.

7 Claims, 8 Drawing Sheets

POWER CONVERSION APPARATUS

CROSS-REFERENCE TO RELATED APPLICATION

This application is based on and claims the benefit of priority from Japanese Patent Application No. 2016-120649, filed Jun. 17, 2016. The entire disclosure of the above application is incorporated herein by reference.

BACKGROUND

Technical Field

The present disclosure relates to a power conversion apparatus.

Related Art

Conventionally, a power conversion apparatus that performs a modulation process to improve a voltage utilization rate is known. For example, in JP-A-2012-125022, a power conversion apparatus switches between two-phase modulation and three-phase modulation to prevent a duty at which distortion occurs in an inter-line voltage due to the effects of dead time.

In cases in which driving is performed while the modulation process is switched between the two-phase modulation and the three-phase modulation as in JP-A-2012-125022, hunting may occur before and after the switching, thereby causing noise and vibration.

SUMMARY

It is thus desired to provide a power conversion apparatus that is capable of reducing the occurrence of noise and vibration caused by switching of control.

An exemplary embodiment provides a power conversion apparatus of the present disclosure converts power of an electric rotating machine including a three-phase winding set. The power conversion apparatus includes an inverter unit and a control unit.

The inverter unit has a plurality of switching elements provided in correspondence to the phases of the winding set.

The control unit controls currents of the winding set by controlling on-off operations of the switching elements by pulse width modulation control. The control unit has a modulation processing unit. The modulation processing unit performs a modulation process that is a down-shift process or an up-shift process. In the down-shift process, a neutral-point voltage is shifted towards a low voltage side such that a smallest phase voltage command value is a lower fixed value that is a first lower limit value or a second lower limit value. In the up-shift process, the neutral-point voltage is shifted towards a high voltage side such that a largest phase voltage command value is an upper fixed value that is a first upper limit value or a second upper limit value.

The modulation processing unit selects either of a first fixed value and a second fixed value based on a difference between the phase voltage command values in the down-shift process or the up-shift process. The first fixed value is the first lower limit value or the first upper limit value. The second fixed value is the second lower limit value or the second upper limit value. In the modulation process, the first fixed value is switched to the second fixed value based on a first determination value. The second fixed value is switched to the first fixed value based on a second determination value. The first determination value and the second determination value are differing values.

In the present exemplary embodiment, either of the first fixed value and the second fixed value is selected based on the difference between the phase voltage command values. Therefore, the duties of all phases can be prevented from becoming an avoidance duty that is a duty at which distortion occurs in an inter-line voltage due to the effects of dead time. As a result, distortion in the inter-line voltage can be reduced. In addition, the first determination value and the second determination value are differing values. Therefore, hunting that occurs before and after the switching can be prevented. Consequently, the occurrence of noise and vibration caused by hunting can be suppressed.

DESCRIPTION OF THE EMBODIMENTS

A power conversion apparatus of the present disclosure will be described with reference to the drawings. Hereafter, configurations that are essentially identical among a plurality of embodiments are given the same reference numbers. Descriptions thereof are omitted.

First Embodiment

A first embodiment of the present disclosure will be described with reference to FIGS. 1 to 7C.

Figure 1:
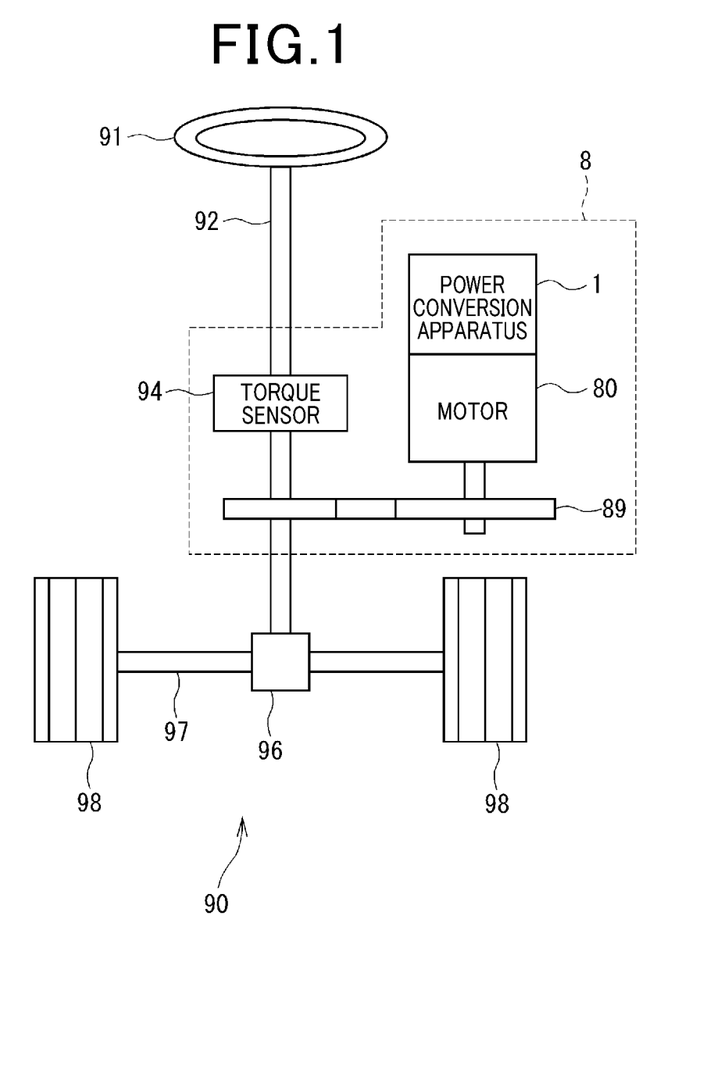
FIG. 1 is an overall configuration diagram of a steering system according to a first embodiment of the present disclosure.

As shown in FIG. 1, a power conversion apparatus 1 is applied to an electric power steering apparatus 8, together with a motor 80. The motor 80 is a rotating electric machine.

The electric power steering apparatus 8 assists with steering operations performed by a driver.

FIG. 1 shows a configuration of a steering system 90 that includes the electric power steering apparatus 8. The steering system 90 includes a steering wheel 91, a steering shaft 92, a pinion gear 96, a rack shaft 97, wheels 98, the electric power steering apparatus 8, and the like. The steering wheel 91 is a steering component.

The steering wheel 91 is connected to the steering shaft 92. The steering shaft 92 is provided with a torque sensor 94. The torque sensor 94 detects a steering torque Ts that is inputted as a result of the steering wheel 91 being operated by the driver.

The pinion gear 96 is provided at the tip of the steering shaft 92. The pinion gear 96 meshes with the rack shaft 97. A pair of wheels 98 are coupled to both ends of the rack shaft 97 by tie rods or the like.

When the driver rotates the steering wheel 91, the steering shaft 92 that is connected to the steering wheel 91 rotates. The pinion gear 96 converts the rotating motion of the steering shaft 92 to a linear motion of the rack shaft 97. The pair of wheels 98 are steered to an angle that is based on the amount of displacement of the rack shaft 97.

The electric power steering apparatus 8 includes the motor 80, a reduction gear 89, the power conversion apparatus 1, and the like. The reduction gear 89 decelerates the rotation of the motor 80 and transmits the decelerated rotation to the steering shaft 92. That is, the electric power steering apparatus 8 according to the present embodiment is a so-called column-assist type. However, the electric power steering apparatus 8 may also be a so-called rack-assist type that transmits the rotation of the motor 80 to the rack shaft 97.

The motor 80 outputs an assistance torque that assists the driver in steering the steering wheel. The motor 80 is driven by receiving power supplied from a battery 105 (see FIG. 2). The battery 105 serves as a power supply. The motor 80 thereby rotates the reduction gear 89 in forward and reverse directions. The motor 80 is a three-phase brushless motor that has a rotor and a stator (not shown).

Figure 2:
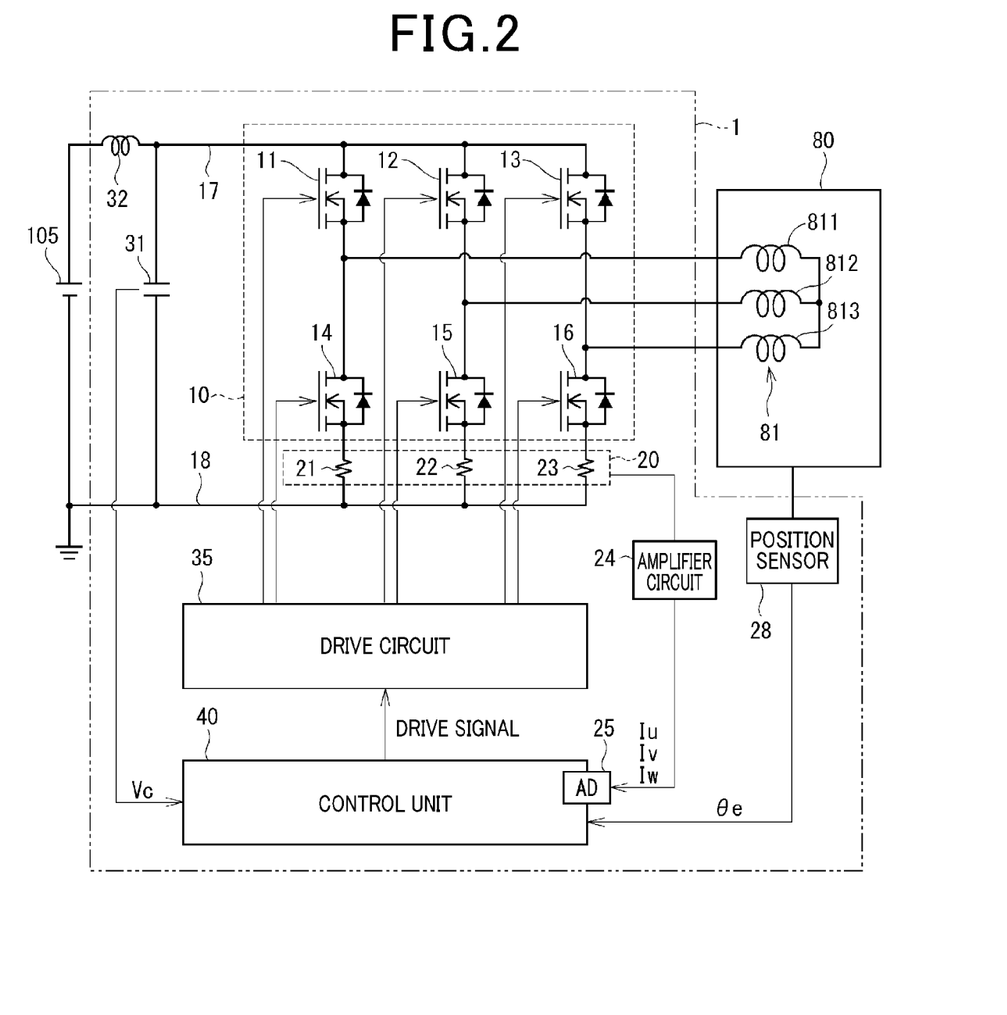
FIG. 2 is a circuit diagram of a power conversion apparatus according to the first embodiment of the present disclosure.

As shown in FIG. 2, the motor 80 includes a winding set 81 for three phases. The winding set 81 has a U-phase coil 811, a V-phase coil 812, and a W-phase coil 813. The winding set 81 is wound around the stator.

The power conversion apparatus 1 includes an inverter unit 10, a current detecting unit 20, a control unit 40, and the like.

The inverter unit 10 has six switching elements 11 to 16. The inverter unit 10 converts power sent to the winding set 81. Hereafter, the switching element is referred to as an SW element. The SW elements 11 to 16 are metal-oxide-semiconductor field-effect transistors (MOSFETs). However, the SW elements 11 to 16 may be insulated-gate bipolar transistors (IGBTs), thermistors, or the like.

The SW elements 11 to 13 are connected to a high potential side. The SW elements 14 to 16 are connected to a low potential side. One end of the U-phase coil 811 is connected to a connection point between the U-phase SW elements 11 and 14 that form a pair. One end of the V-phase coil 812 is connected to a connection point between the V-phase SW elements 12 and 15 that form a pair. One end of the W-phase coil 813 is connected to a connection point between the W-phase SW elements 13 and 16 that form a pair. The other ends of the coils 811 to 813 are connected together.

The drains of the SW elements 11 to 13 arranged on the high potential side are connected to a positive electrode of the battery 105 via an upper bus 17. The sources of the SW elements 14 to 16 arranged on the low potential side are grounded via a lower bus 18. Hereafter, the SW elements 11 to 13 connected to the high potential side are referred to as upper arm elements, and the SW elements 14 to 16 connected to the low potential side are referred to as lower arm elements, as appropriate.

The current detecting unit 20 has a U-phase current detection element 21, a V-phase current detection element 22, and a W-phase current detection element 23. The current detecting unit 20 is provided on the low potential side of the inverter unit 10. Specifically, the U-phase current detection element 21 is provided between the U-phase lower arm element 14 and the lower bus 18. The V-phase current detection element 22 is provided between the V-phase lower arm element 15 and the lower bus 18. The W-phase current detection element 23 is provided between the W-phase lower arm element 16 and the lower bus 18.

The current detection elements 21 to 23 according to the present embodiment are shunt resistors. The voltages across both ends of the current detection elements 21 to 23 are outputted to the control unit 40, via an amplifier circuit 24, as detection values respectively related to phase currents Iu, Iv, and Iw. In addition, the detection values of the phase currents Iu, Iv, and Iw are converted to digital signals by an analog-to-digital (AD) conversion circuit 25.

A position sensor 28 detects an electrical angle $\theta e$ as a rotation position of the motor 80 and outputs the detection value to the control unit 40.

A capacitor 31 and a coil 32 are arranged between the battery 105 and the inverter 10. The capacitor 31 and the coil 32 configure a power filter. As a result of the power filter being provided, noise transmitted from other apparatuses sharing the battery 105 is reduced. In addition, noise transmitted from the inverter unit 10 side to other apparatuses sharing the battery 105 is also reduced.

The capacitor 31 is connected to the upper bus 17 and the lower bus 18 on the inverter unit 10 side of the coil 32. The capacitor 31 assists with power supply to the inverter unit 10 by storing electrical charge and suppresses noise components such as a surge current. A capacitor voltage Vc that is the voltage of the capacitor 31 is detected by a capacitor voltage detecting unit (not shown), and the detection value is outputted to the control unit 40.

In addition, a power supply relay (not shown) is provided between the battery 105 and the capacitor 31 on the upper bus 17. The power supply relay is capable of blocking power supply from the battery 105 to the inverter unit 10.

The control unit 40 is mainly configured as a microcomputer or the like. Processes performed by the control unit 40 may be software processes performed by a central processing unit (CPU) running programs stored in advance in a tangible memory apparatus such as a read-only memory (ROM). Alternatively, the processes may be hardware processes performed by dedicated electronic circuits.

The control unit 40 generates drive signals for controlling on-off operations of the SW elements 11 to 16, based on the phase currents Iu, Iv, and Iw acquired by the current detecting unit 20, the electrical angle $\theta e$ acquired by the position sensor 28, the steering torque Ts acquired by the torque sensor 94, and the like. The generated drive signals are outputted to the gates of the SW elements 11 to 16 via a drive circuit 35.

Figure 3:
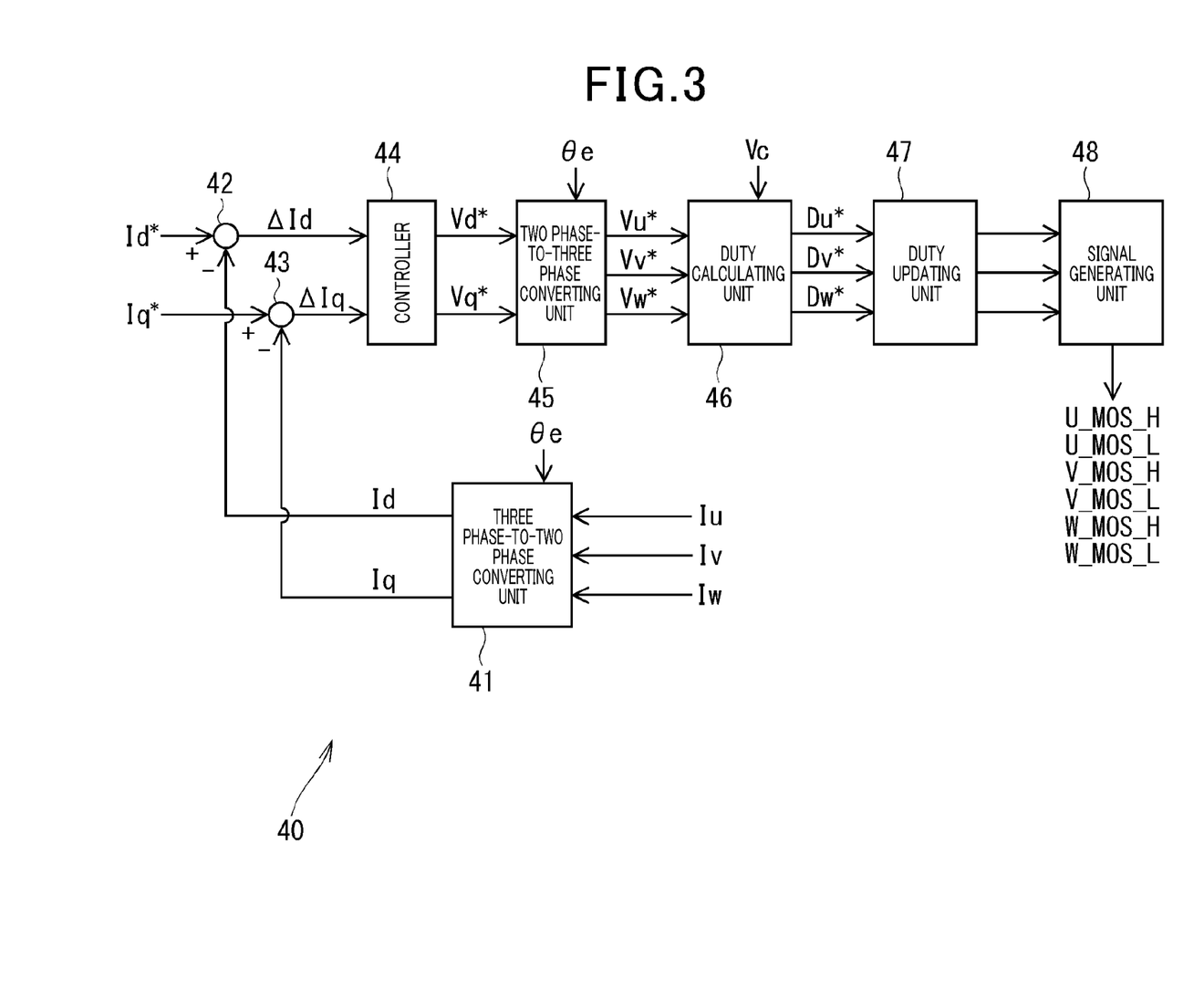
FIG. 3 is a block diagram of a control unit according to the first embodiment of the present disclosure.

As shown in FIG. 3, as a functional block, the control unit 40 includes a three phase-to-two phase converting unit 41, subtractor 42 and 43, a controller 44, a two phase-to-three phase converting unit 45, a duty calculating unit 46, a duty updating unit 47, a signal generating unit 48, and the like.

The three phase-to-two phase converting unit 41 performs dq conversion on the phase currents Iu, Iv, and Iw based on the electrical angle θe, and calculates a d-axis current detection value Id and a q-axis current detection value Iq.

The d-axis subtractor 42 subtracts the d-axis current detection value Id from a d-axis current command value Id* and calculates a d-axis current deviation ΔId. The q-axis subtractor 43 subtracts the q-axis current detection value Iq from a q-axis current command value Iq* and calculates a q-axis current deviation ΔIq.

The controller 44 calculates a d-axis voltage command value Vd* and a q-axis voltage command value Vq* by proportional-integral (PI) calculation or the like, such that the current deviations ΔId and ΔIq are converged to zero.

The two phase-to-three phase converting unit 45 performs reverse-dq conversion on the d-axis voltage command value Vd* and the q-axis voltage command value Vq* based on the electrical angle θe, and calculates a U-phase voltage command value Vu*, a V-phase voltage command value Vv*, and a W-phase voltage command value Vw*.

The duty calculating unit 46 calculates duty command values Du*, Dv*, and Dw* based on the U-phase voltage command value Vu*, the V-phase voltage command value Vv*, and the W-phase voltage command value Vw*. Details of the calculation of the duty command values Du*, Dv*, and Dw* will be described hereafter.

The duty updating unit 47 sets and updates the duty command values Du*, Dv*, and Dw* calculated by the duty calculating unit 46.

The signal generating unit 48 compares the duty command values Du*, Dv*, and Dw* with a pulse width modulation (PWM) signal. The PWM signal is a carrier signal that is a triangular wave signal or the like. The signal generating unit 48 then outputs U_MOS_H, U_MOS_L, V_MOS_H, V_MOS_L, W_MOS_H, and W_MOS_L to the drive circuit 35, as drive signals that switch ON and OFF the SW elements 11 to 16. When U_MOS_H is outputted, the SW element 11 is turned on and the SW element 14 is turned off. When the U_MOS_L is outputted, the SW element 11 is turned OFF and the SW element 14 is turned ON. When the V_MOS_H is outputted, the SW element 12 is turned on and the SW element 15 is turned off. When the V_MOS_L is outputted, the SW element 12 is turned OFF and the SW element 15 is turned ON. When the W_MOS_H is outputted, the SW element 13 is turned on and the SW element 16 is turned off. When the W_MOS_L is outputted, the SW element 13 is turned off and the SW element 16 is turned on.

According to the present embodiment, a dead-time period is provided to prevent a short circuit caused by an SW element pair, that is, the SW element 11 and the SW element 14, the SW element 12 and the SW element 15, or the SW element 13 and the SW element 16 being simultaneously turned on. During the dead-time period, the SW element pair, that is, the SW element 11 and the SW element 14, the SW element 12 and the SW element 15, or the SW element 13 and the SW element 16 are both turned off. The dead-time period can be set as appropriate taking into consideration an effective pulse width and other factors. According to the present embodiment, a description is given in which the duty command values Du*, Dv*, and Dw* are from 0% to 100%, and the duty corresponding to the dead time is 4%. Hereafter, the duty corresponding to the dead time is simply referred to as dead time. In addition, the dead time is indicated in the drawings by DT, as appropriate.

Figure 4:
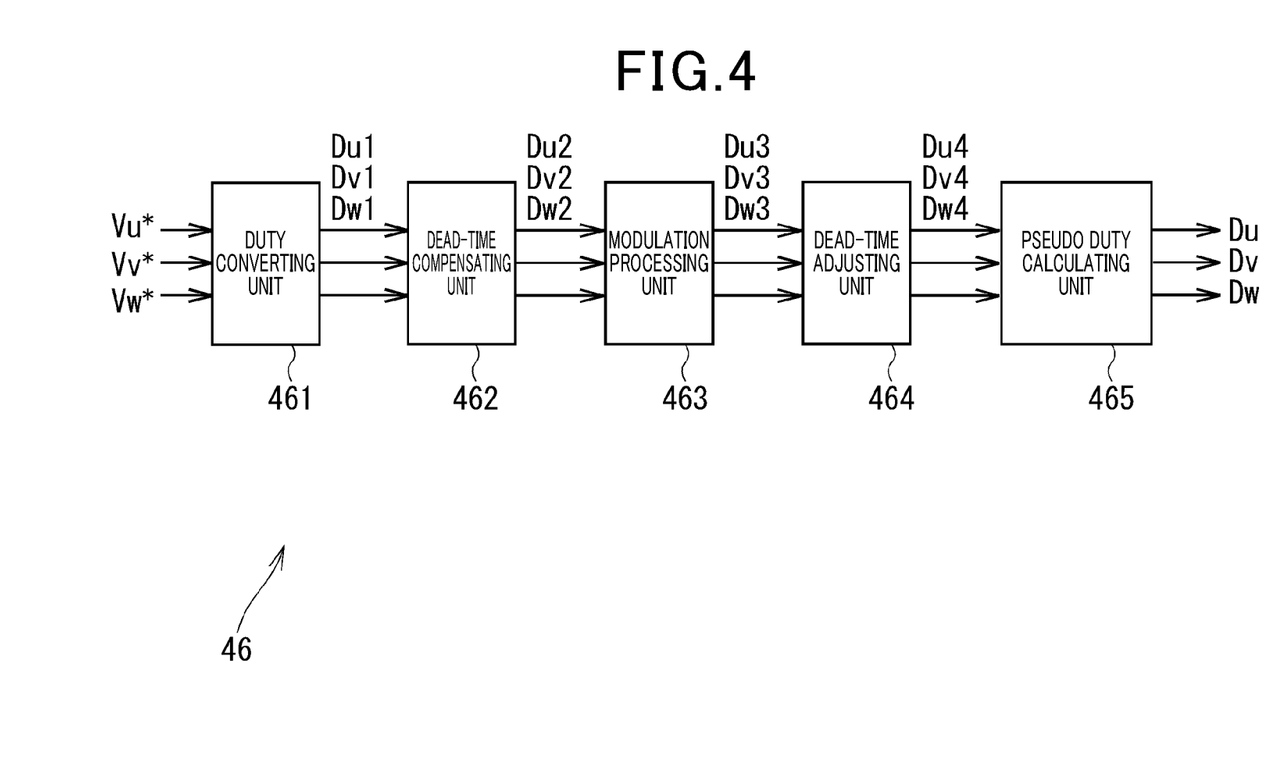
FIG. 4 is a block diagram of a duty calculating unit according to the first embodiment of the present disclosure.

As shown in FIG. 4, the duty calculating unit 46 has a duty converting unit 461, a dead-time compensating unit 462, a modulation processing unit 463, a dead-time adjusting unit 464, and a pseudo duty calculating unit 465.

The duty converting unit 461 converts the voltage command values Vu*, Vv*, and Vw* to duties, and calculates duty conversion values Du1, Dv1, and Dw1.

The dead-time compensating unit 462 corrects the duty conversion values Du1, Dv1, and Dw1 based on a dead-time compensation amount Ddt to cancel out a change amount by which the voltages applied to the coils 811 to 813 change due to the effects of dead time.

Specifically, the dead time compensating unit 462 adds the dead-time compensation amount Ddt to the duty conversion value Du1 when the U-phase current Iu is positive. The dead time compensating unit 462 subtracts the dead-time compensation amount Ddt from the duty conversion value Du1 when the U-phase current Iu is negative. The dead time compensating unit 462 adds the dead-time compensation amount Ddt to the duty conversion value Dv1 when the V-phase current Iv is positive. The dead time compensating unit 462 subtracts the dead-time compensation amount Ddt from the duty conversion value Dv1 when the V-phase current Iv is negative. The dead time compensating unit 462 adds the dead-time compensation amount Ddt to the duty conversion value Dw1 when the W-phase current Iw is positive. The dead time compensating unit 462 subtracts the dead-time compensation amount Ddt from the duty conversion value Dw1 when the W-phase current Iw is negative.

The current direction of the currents flowing into the coils 811 to 813 is positive. The current direction of the currents flowing out of the coils 811 to 813 is negative.

The duties that have been subjected to dead-time compensation and inputted to the modulation processing unit 463 are input duties Du2, Dv2, and Dw2.

The modulation processing unit 463 modulates the input duties Du2, Dv2, and Dw2 and calculates output duties Du3, Dv3, and Dw3. According to the present embodiment, the modulation processing unit 463 performs a down-shift process in which a neutral-point voltage is shifted towards a low voltage side by the smallest duty of the phases being modulated to be a lower fixed value Lfix. According to the present embodiment, the down-shift process corresponds to a modulation process. As a result of the modulation process, the neutral-point voltage, which is an average value of the phase voltages, is changed and the voltage utilization rate can be improved. Here, even when the neutral-point voltage changes, the voltage applied to the winding set 81 does not change unless the inter-line voltage changes. Hereafter, the modulation performed such that the smallest duty of the phases becomes the lower fixed value Lfix is referred to as "lower flatbed modulation".

The modulation processing unit 463 switches the lower fixed value Lfix to a first lower limit value DL1 or a second lower limit value DL2 based on a difference between the input duties Du2, Dv2, and Dw2. According to the present embodiment, the first lower limit value DL1 is 0%. In addition, the second lower limit value DL2 is a value set based on the dead time and is 4% according to the present embodiment.

Here, a duty at which distortion occurs in the inter-line voltage due to the effects of dead time is present. The duty at which distortion occurs in the inter-line voltage is referred to as an avoidance duty Da. According to the present embodiment, the dead time is 4%. Therefore, the range of the avoidance duty Da during lower flatbed modulation is 0<Da<4. A duty of 0% can be outputted by the upper arm elements 11 to 13 being turned OFF and the lower arm elements 14 to 16 being turned ON. Therefore, the duty of 0% is omitted from the range of the avoidance duty Da.

Here, the smallest duty of the phases is referred to as a minimum duty MinDuty. The middle duty of the phases is referred to as a middle duty MidDuty. The largest duty of the phases is referred to as a maximum duty MaxDuty. A value obtained by the minimum duty MinDuty being subtracted from the middle duty MidDuty is a subtraction value diff1. When the subtraction value diff1 is 0<diff1<4, should the lower flatbed modulation be performed such that the smallest duty of the phases is the first lower limit value DL1, the middle duty of the phases becomes the avoidance duty Da. Distortion occurs in the inter-line voltage. Therefore, according to the present embodiment, the lower fixed value Lfix is switched based on the subtraction value diff1 such that none of the duties of the phases become the avoidance duty Da.

In addition, when the same determination value is used for when the lower fixed value Lfix is switched from the first lower limit value DL1 to the second lower limit value DL2 and when the lower fixed value Lfix is switched from the second lower limit value DL2 to the first lower limit value DL1, hunting may occur before and after the switch. When hunting occurs, noise and vibration may occur.

Therefore, according to the present embodiment, the determination value for switching the lower fixed value Lfix from the first lower limit value DL1 to the second lower limit value DL2, and the determination value for switching the lower fixed value Lfix from the second lower limit value DL2 to the first lower limit value DL1 in the lower flatbed modulation process are set to differing values. As a result, hysteresis is applied, thereby preventing the occurrence of hunting caused by switching of the lower fixed value Lfix.

The modulation process according to the present embodiment will be described with reference to the flowchart in FIG. 5. The modulation process is performed by the modulation processing unit 463. Hereafter, step is omitted from step S101 and simply indicated by the symbol S. This similarly applies to other steps.

At the first S101, the modulation processing unit 463 sets the smallest duty among the input duties Du2, Dv2, and Dw2 as the minimum duty MinDuty, the second smallest duty as the middle duty MidDuty, and the largest duty as the maximum duty MaxDuty.

At S102, the modulation processing unit 463 determines whether or not the current lower fixed value Lfix is the first lower limit value DL1. When determined that the current lower fixed value Lfix is not the first lower limit value DL1, that is, the current lower fixed value Lfix is the second lower limit value DL2 (NO at S102), the modulation processing unit 463 proceeds to S105. When determined that the current lower fixed value Lfix is the first lower limit value DL1 (YES at S102), the modulation processing unit 463 proceeds to S103.

At S103, the modulation processing unit 463 determines whether or not the subtraction value diff1 is less than a first determination value TH1. The first determination value TH1 is a value set based on the dead time. According to the present embodiment, the first determination value TH1 is set to 4%. When determined that the subtraction value diff1 is equal to or greater than the first determination value TH1 (NO at S103), the modulation processing unit 463 proceeds to S107 without changing the lower fixed value Lfix from the first lower limit value DL1. When determined that the subtraction value diff1 is less than the first determination value TH1 (YES at S103), the modulation processing unit 463 proceeds to S104.

At S104, the modulation processing unit 463 changes the lower fixed value Lfix to the second lower limit value DL2.

At S105 to which the modulation processing unit 463 proceeds when determined that the current lower fixed value Lfix is the second lower limit value DL2 (NO at S102), the modulation processing unit 463 determines whether or not the subtraction value diff1 is greater than a second determination value TH2. The second determination value TH2 is set to a predetermined value (such as 8%) that is greater than the first determination value TH1. When determined that the subtraction value diff1 is equal to or less than the second determination value TH2 (NO at S105), the modulation processing unit 463 proceeds to S107 without changing the lower fixed value Lfix from the second lower limit value DL2. When determined that the subtraction value diff1 is greater than the second determination value TH2 (YES at S105), the modulation processing unit 463 proceeds to S106.

At S106, the modulation processing unit 463 changes the lower fixed value Lfix to the first lower limit value DL1.

At S107, the modulation processing unit 463 performs the lower flatbed modulation process such that the smallest duty of the phases is the lower fixed value Lfix, and calculates the output duties Du3, Dv3, and Dw3. The output duties Du3, Dv3, and Dw3 are calculated by expressions (1) to (3). The calculated output duties Du3, Dv3, and Dw3 are outputted to the dead-time adjusting unit 464.

$$Du3 = Du2 - \text{MinDuty} + L\text{fix} \quad (1)$$

$$Dv3 = Dv2 - \text{MinDuty} + L\text{fix} \quad (2)$$

$$Dw3 = Dw2 - \text{MinDuty} + L\text{fix} \quad (3)$$

Figure 6A:
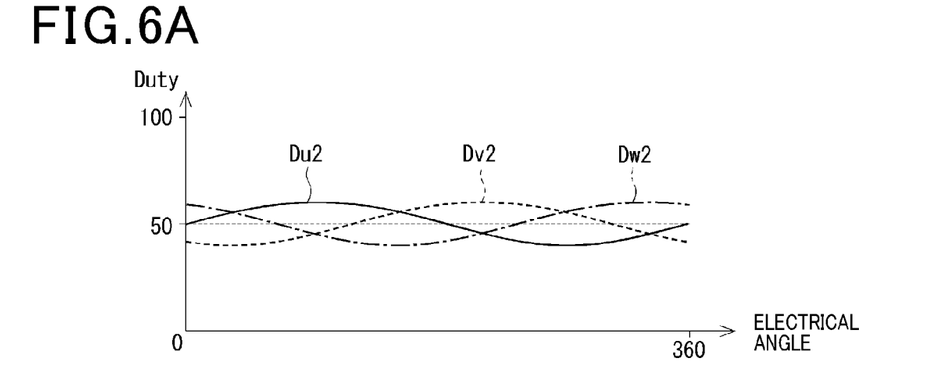
FIG. 6A is a waveform diagram of input duty during low-speed rotation according to the first embodiment of the present disclosure.
Figure 6B:
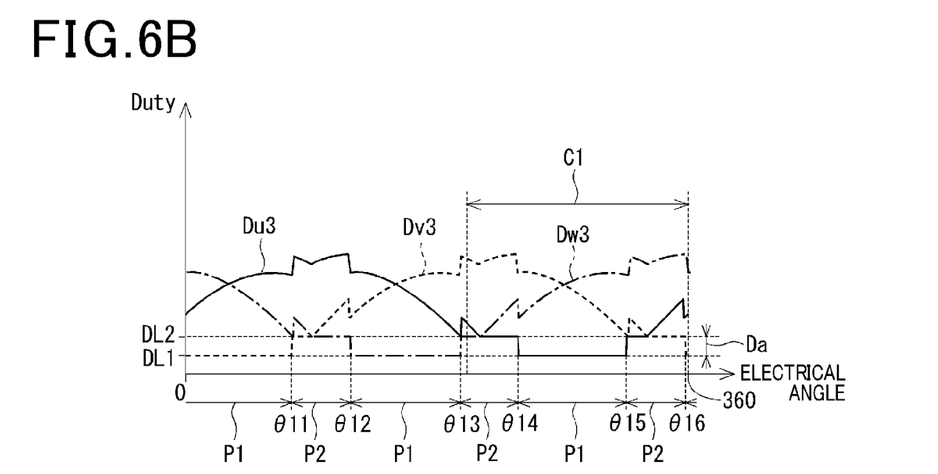
FIG. 6B is a waveform diagram of output duty during low-speed rotation according to the first embodiment of the present disclosure.
Figure 6C:
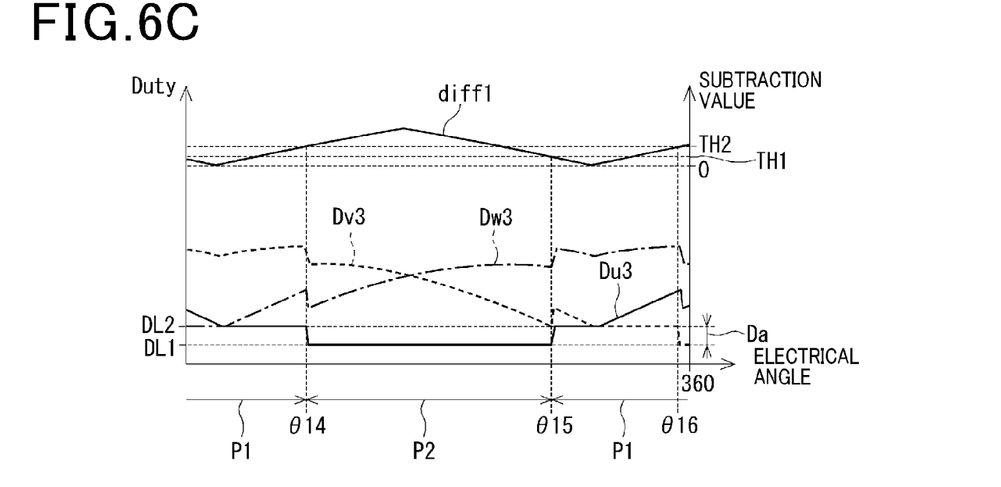
FIG. 6C is a waveform diagram showing an enlarged view of a section of FIG. 6B according to the first embodiment of the present disclosure.
Figure 7A:
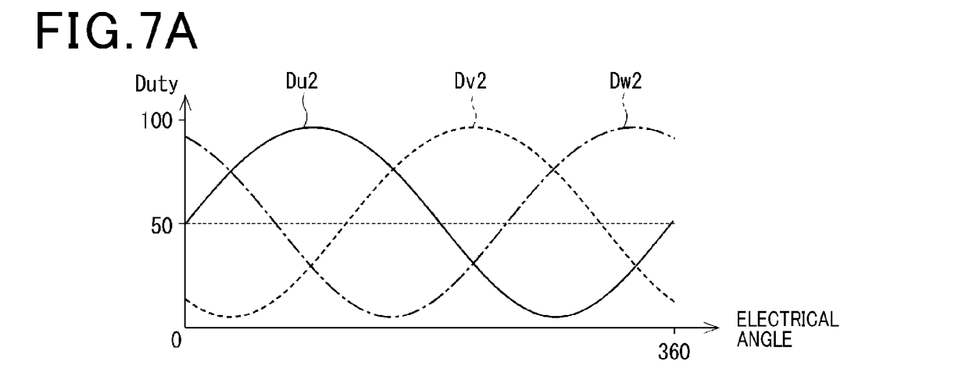
FIG. 7A is a waveform diagram of input duty during high-speed rotation according to the first embodiment of the present disclosure.
Figure 7B:
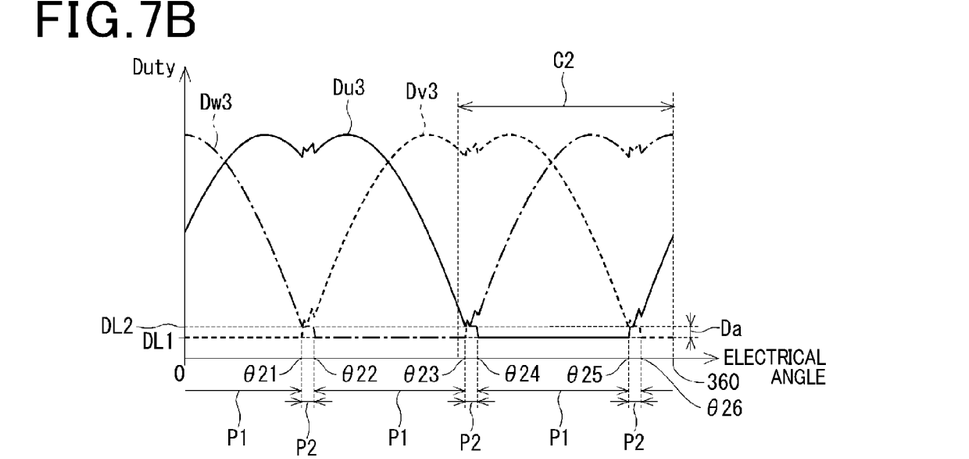
FIG. 7B is a waveform diagram of output duty during high-speed rotation according to the first embodiment of the present disclosure.
Figure 7C:
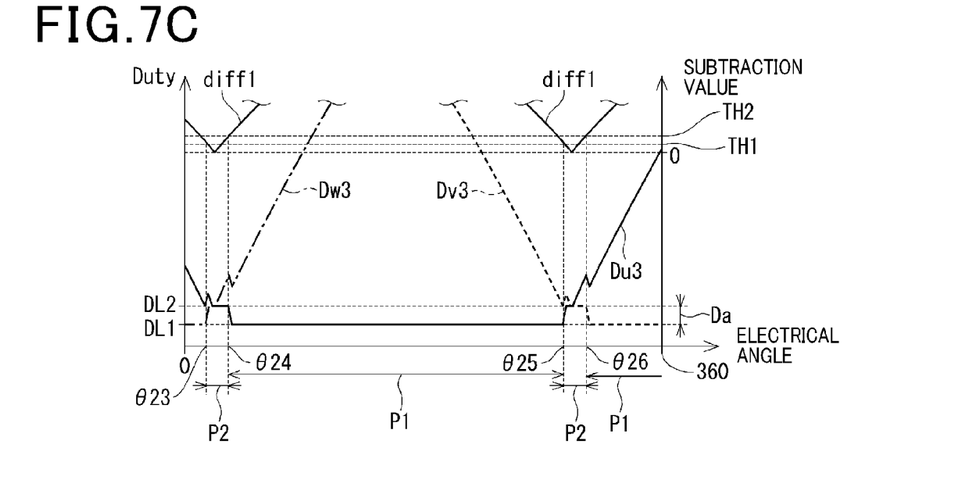
FIG. 7C is a waveform diagram showing an enlarged view of a section of FIG. 7B according to the first embodiment of the present disclosure.

The modulation process will be described with reference to FIGS. 6A to 6C and 7A to 7C. FIGS. 6A to 6C and 7A to 7C show examples in which the motor 80 is rotated at a constant rotation by constant energization. In FIGS. 6A to 6C, the motor 80 is rotated at a low speed. In FIGS. 7A to 7C, the motor 80 is rotated at a high speed. In addition, FIGS. 6A and 7A show the input duties Du2, Dv2, and Dw2. FIGS. 6B and 7B show the output duties Du3, Dv3, and Dw3. FIG. 6C is an enlarged view of a section C1 in FIG. 6B. FIG. 7C is an enlarged view of section C2 in FIG. 7B. In FIGS. 6A to 6C and 7A to 7C, a horizontal axis indicates the electrical angle. A vertical axis indicates the duty or the subtraction value diff1. FIGS. 6B, 6C, and 7C extend in the vertical direction. As described above, according to the present embodiment, the first lower limit value DL1 is 0%. However, to prevent the drawings from becoming complicated, in FIGS. 6B, 6C, 7B, and 7C, the horizontal axis is shifted below zero. In addition, to simplify the description, FIGS. 6A to 6C and 7A to 7C show waveforms of when the dead time is 0. When the dead time is not 0, the duty increases and decreases as a result of the switching between addition and subtraction of the dead-time compensation amount Ddt based on the direction of the phase current. However, the waveform at the section related to the switching of the lower fixed value Lfix is similar to that when the dead time is 0.

As shown in FIGS. 6A to 6C and 7A to 7C, according to the present embodiment, the duties of all phases are prevented from becoming the avoidance duty Da as a result of the lower fixed value Lfix being switched. A period over which the lower fixed value Lfix is the first lower limit value DL1 is a period P1. A period over which the lower fixed value Lfix is the second lower limit value DL2 is a period P2.

According to the present embodiment, at a timing at which the subtraction value diff1 becomes less than the first determination value TH1, that is, at θ11, θ13, and θ15 in FIGS. 6A to 6C and θ21, θ23, and θ25 in FIGS. 7A to 7C, the lower fixed value Lfix is switched from the first lower limit value DL1 to the second lower limit value DL2. Here, when the switching between the second lower limit value DL2 and the first lower limit value DL1 is performed based on the same determination value, hunting in which the lower fixed value Lfix is frequently switched may occur due to fluctuations in amplitude, the electrical angle θe, and the like. Therefore, according to the present embodiment, when the lower fixed value Lfix is switched to the second lower limit value DL2, the lower flatbed modulation process in which the lower fixed value Lfix is the second lower limit value DL2 is continued until the subtraction value diff1 becomes greater than the second determination value TH2.

In addition, at a timing at which the subtraction value diff1 becomes greater than the second determination value TH2, that is, at θ12, θ14, and θ16 in FIG. 6A to FIG. 6C and θ22, θ24, and θ26 in FIG. 7A to FIG. 7C, the lower fixed value Lfix is switched from the second lower limit value DL2 to the first lower limit value DL1. Then, when the lower fixed value Lfix is switched to the first lower limit value DL1, the lower flatbed modulation process in which the lower fixed value Lfix is the first lower limit value DL1 is continued until the subtraction value diff1 becomes less than the first determination value TH1.

As a result, hunting that accompanies the switching of the lower fixed value Lfix can be prevented. Therefore, the occurrence of noise and vibration caused by hunting can be suppressed.

Returning to FIG. 4, the dead-time adjusting unit 464 performs an adjustment process when the lower fixed value Lfix is the first lower limit value DL1, that is, when the lower flatbed modulation is being performed such that the smallest duty of the phases is 0%. In the adjustment process, the dead-time compensation amount Ddt that has been corrected in advance by the dead-time compensating unit 462 is adjusted. The dead-time adjusting unit 464 then calculates post-adjustment duties Du4, Dv4, and Dw4. In addition, when the lower fixed value Lfix is the second lower limit value DL2, the dead-time adjusting unit 464 sets the output duties Du3, Dv3, and Dw3 as is, as the post-adjustment duties Du4, Dv4, and Dw4, without performing the adjustment process.

Here, an example in which the output duty Du3 is modulated by the lower flatbed modulation to the first lower limit value DL1, which is 0%, is described. When the U-phase duty is 0%, the dead time causes no effects because a state in which the SW element 11 is turned off and the SW element 14 is turned on is continued. Therefore, an adjustment amounting to the dead-time compensation amount Ddt that has been corrected in advance by the dead-time compensating unit 462 is performed. According to the present embodiment, the adjustment process is performed by the V-phase and W-phase output duties Dv3 and Dw3 being adjusted, instead of the U-phase output duty Du3, which is the smallest duty of the phases, being adjusted.

When the U-phase current Iu is negative, the dead-time compensation amount Ddt is subtracted from the U-phase output duty Du3. Therefore, the dead-time compensation amount Ddt is subtracted from the output duties Dv3 and Dw3, instead of the dead-time compensation amount Ddt being added to the output duty Du3 (refer to expressions (4) to (6)). In addition, as shown in expressions (7) and (8), as a result of the dead-time compensation amount Ddt being subtracted from the output duties Dv3 and Dw3, the same effect as that when the dead-time compensation amount Ddt is added to the output duty Du3 can be obtained in the inter-line voltage.

$$Du4=Du3 \quad (4)$$

$$Dv4=Dv3-Ddt \quad (5)$$

$$Dw4=Dw3-Ddt \quad (6)$$

$$Du4-Dv4=(Du3+Ddt)-Dv3 \quad (7)$$

$$Du4-Dw4=(Du3+Ddt)-Dw3 \quad (8)$$

In addition, when the U-phase current Iu is positive, the dead-time compensation amount Ddt is added to the U-phase output duty Du3. Therefore, the dead-time compensation amount Ddt is added to the output duties Dv3 and Dw3, instead of the dead-time compensation amount Ddt being subtracted from the output duty Du3 (refer to expressions (9) to (11)). In addition, as shown in expressions (12) and (13), as a result of the dead-time compensation amount Ddt being added to the output duties Dv3 and Dw3, the same effect as that when the dead-time compensation amount Ddt is subtracted from the output duty Du3 can be obtained in the inter-line voltage.

$$Du4=Du3 \quad (9)$$

$$Dv4=Dv3+Ddt \quad (10)$$

$$Dw4=Dw3+Ddt \quad (11)$$

$$Du4-Dv4=(Du3-Ddt)-Dv3 \quad (12)$$

$$Du4-Dw4=(Du3-Ddt)-Dw3 \quad (13)$$

When the smallest duty of the phases is the output duty Dv3 that is 0%, the output duties Du3 and Dw3 are adjusted. When the smallest duty of the phases is the output duty Dw3 that is 0%, the output duties Du3 and Dv3 are adjusted The details of the adjustment method are similar to those when the smallest duty of the phases is the output duty Du3.

The pseudo duty calculating unit 465 calculates the duty command values Du*, Dv*, and Dw*.

When the process performed by the three phase-to-two phase converting unit 41 to the process performed by the dead-time adjusting unit 464 are referred to as a "control calculation process," a predetermined amount of time is required to perform this control calculation process. Here, for example, when duty updates are performed at a similar frequency as the calculation frequency of the control calculation process, it may be desirable for the duty updates to be performed at a higher frequency than the control calculation process in cases in which noises occur and the like. Therefore, the pseudo duty calculating unit 465 performs a pseudo duty calculation process such that the duty updates are performed at the desired frequency. For example, as in JP-A-2012-125022, an intermediate value can be calculated through linear correction of a previous calculation value and a current calculation value. The duty updates can be performed at a desired frequency, regardless of the amount of time required for the control calculation process, through use of the intermediate values, in addition to the calculation values of the control calculation process. The pseudo duty calculating unit 465 calculates the intermediate values and outputs the intermediate values as the duty command values Du*, Dv*, and Dw*, in addition to the post-adjustment duties Du4, Dv4, and Dw4 calculated by the dead-time adjusting unit 464, to the duty updating unit 47 (see FIG. 3).

As described above, the power conversion apparatus 1 according to the present embodiment converts the power of the motor 80 that includes the winding set 81. The power conversion apparatus 1 includes the inverter unit 10 and the control unit 40.

The inverter unit 10 includes the plurality of switching elements 11 to 16, provided in correspondence to the phases of the winding set 81.

The control unit 40 controls the current of the winding set 81 by controlling the on-off operations of the SW elements 11 to 16 by PWM control. The control unit 40 includes the modulation processing unit 463. The modulation processing unit 463 performs the down-shift process in which the neutral-point voltage is shifted towards the low voltage side such that the minimum duty MinDuty is the lower fixed value Lfix. The minimum duty MinDuty is the smallest input duty among the input duties Du2, Dv2, and Dw2. The lower fixed value Lfix is the first lower limit value DL1 or the second lower limit value DL2.

According to the present embodiment, the first determination value TH1 related to the switching from the first lower limit value DL1 to the second lower limit value DL2 and the second determination value TH2 related to the switching from the second lower limit value DL2 to the first lower limit value DL1 in the down-shift process are differing values.

The modulation processing unit 463 selects either of the first lower limit value DL1 and the second lower limit value DL2 based on the difference between the input duties Du2, Dv2, and Dw2.

According to the present embodiment, whether to set the lower fixed value Lfix to the first lower limit value DL1 or the second lower limit value DL2 is selected based on the difference between the input duties Du2, Dv2, and Dw3. Therefore, the duties of all phases can be prevented from becoming the avoidance duty Da. As a result, distortion in the inter-line voltage can be reduced. In addition, as a result of the first determination value TH1 and the second determination value TH2 being differing values, hunting that occurs before and after switching of the lower fixed value Lfix can be prevented. Consequently, the occurrence of noise and vibration caused by hunting can be suppressed. In particular, fluctuations in duty and the like tend to easily occur in cases in which a detailed compensation process, such as the dead-time compensation process, is performed, as according to the present embodiment. However, as a result of the first determination value TH1 and the second determination value TH2 being set to differing values, the switching of the lower fixed value Lfix can be appropriately performed.

When performing the down-shift process, the modulation processing unit 463 selects either of the first lower limit value DL1 and the second lower limit value DL2 for the lower fixed value Lfix, based on the difference between the middle duty MidDuty that is the second smallest input duty and the minimum duty MinDuty that is the smallest input duty. As a result, either of the first lower limit value DL1 and the second lower limit value DL2 can be appropriately selected.

The second lower limit value DL2 is a value greater than the first lower limit value DL1. The second determination value TH2 is a value greater than the first determination value TH1.

When the subtraction value diff1 is less than the first determination value TH1, the modulation processing unit 463 switches the lower fixed value Lfix from the first lower limit value DL1 to the second lower limit value DL2. The subtraction value diff1 is the value obtained by the minimum duty MinDuty that is the smallest input duty being subtracted from the middle duty that is the second smallest input duty. In addition, when the subtraction value diff1 is greater than the second determination value TH2, the modulation processing unit 463 switches the lower fixed value Lfix from the second lower limit value DL2 to the first lower limit value DL1.

As a result, the occurrence of hunting before and after the switching of the lower fixed value Lfix can be appropriately prevented.

The power conversion apparatus 1 includes the current detecting unit 20 provided on the low potential side of the inverter unit 10. Specifically, the current detection elements 21 to 23 of the current detecting unit 20 are provided between the lower arm elements 14 to 16 and the lower bus 18. As a result, the phase currents Iu, Iv, and Iw can be appropriately detected.

According to the present embodiment, the current detection elements 21 to 23 of the current detecting unit 20 are shunt resistors. The lower arm elements 14 to 16 tend to become higher in temperature than the upper arm elements 11 to 13, as a result of heat generation by the shunt resistors. According to the present embodiment, as a result of the modulation process by the modulation processing unit 463 being the lower flatbed modulation, the period over which the lower arm elements 14 to 16 are turned ON is shorter than when the modulation process is not performed or when upper flatbed modulation, described hereafter, is performed. As a result, uneven heat generation among the elements can be reduced.

According to the present embodiment, the input duties Du2, Dv2, and Dw2 correspond to phase voltage command values. The first lower limit value DL1 corresponds to a first fixed value. The second lower limit value DL2 corresponds to a "second fixed value."

Second Embodiment

Figure 8:
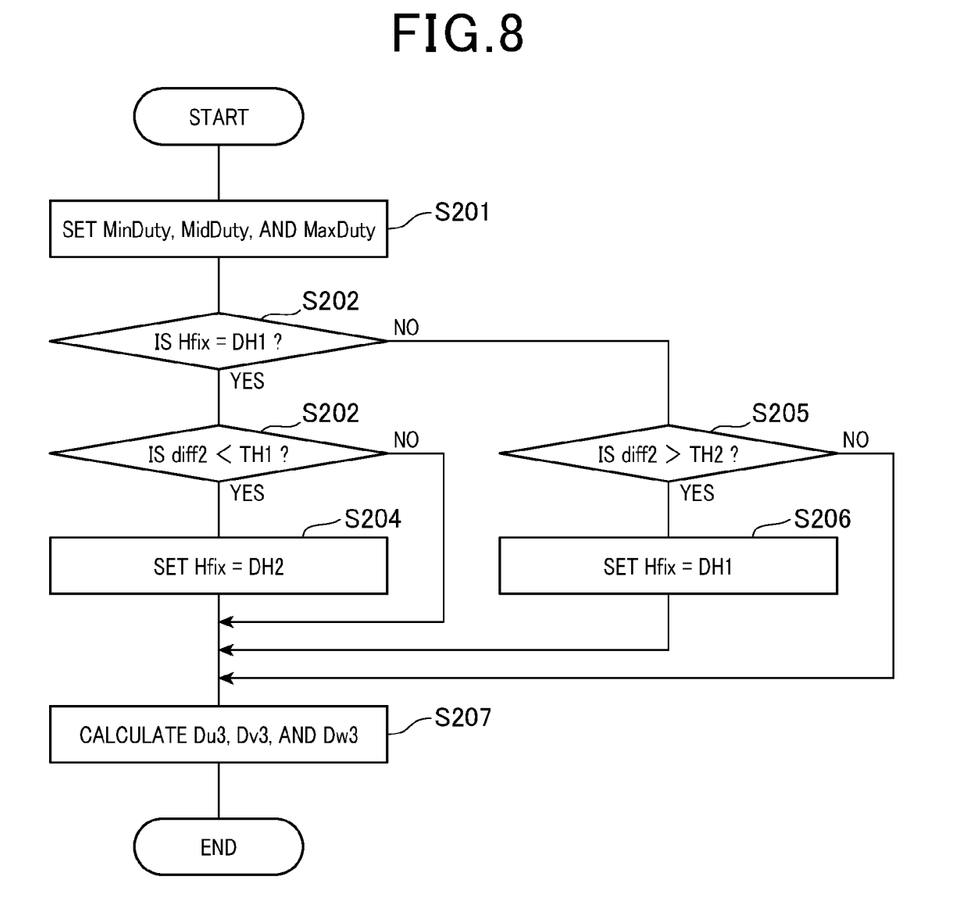
FIG. 8 is a flowchart for explaining a modulation process according to a second embodiment of the present disclosure.

A second embodiment of the present disclosure is shown in FIG. 8.

The present embodiment differs from the first embodiment in terms of the process performed by the modulation processing unit 463. Therefore, this difference will mainly be described.

According to the present embodiment, the modulation processing unit 463 performs Wan up-shift process in which the neutral-point voltage is shifted towards the high voltage side by the largest duty of the phases being modulated to be an upper fixed value Hfix. According to the present embodiment, the up-shift process corresponds to the "modulation process." Hereafter, the modulation performed such that the largest duty of the phases becomes the upper fixed value Hfix is referred to as "upper flatbed modulation".

The modulation processing unit 463 switches the upper fixed value Hfix to a first upper limit value DH1 or a second upper limit value DH2 based on a difference between the input duties Du2, Dv2, and Dw2. According to the present embodiment, the first upper limit value DH1 is 100%. In addition, the second upper limit value DH2 is a value set based on the dead time. In a manner similar to the above-described embodiment, according to the present embodiment, the second upper limit value DH2 is 96% (=100%–4%) when the dead time is 4%.

In addition, the range of the avoidance duty Da for the upper flatbed modulation is 96<Da<100. A duty of 100% can be outputted by the upper arm elements 11 to 13 being turned ON and the lower arm elements 14 to 16 being turned OFF. Therefore, the duty of 100% is omitted from the range of the avoidance duty Da.

Here, a value obtained by the middle duty MidDuty being subtracted from the maximum duty MaxDuty is a subtraction value diff2. When 0<diff2<4, should the upper flatbed modulation be performed such that the largest duty of the phases is the first upper limit value DH1, the middle duty of the phases becomes the avoidance duty Da. Distortion occurs in the inter-line voltage. Therefore, the upper fixed value Hfix is switched based on the subtraction value diff2 such that none of the duties of the phases become the avoidance duty Da.

In addition, when the same determination value is used for when the upper fixed value Hfix is switched from the first upper limit value DH1 to the second upper limit value DH2 and when the upper fixed value Hfix is switched from the second upper limit value DH2 to the first upper limit value DH1, hunting may occur before and after the switch. When hunting occurs, noise and vibration may occur.

Therefore, according to the present embodiment, the determination value for switching the upper fixed value Hfix from the first upper limit value DH1 to the second upper limit value DH2, and the determination value for switching the upper fixed value Hfix from the second upper limit value DH2 to the first upper limit value DH1 in the upper flatbed modulation process are set to differing values. As a result, hysteresis is applied, thereby preventing the occurrence of hunting caused by switching of the upper fixed value Hfix.

The modulation process according to the present embodiment will be described with reference to the flowchart in FIG. 8. The modulation process is performed by the modulation processing unit 463.

Figure 5:
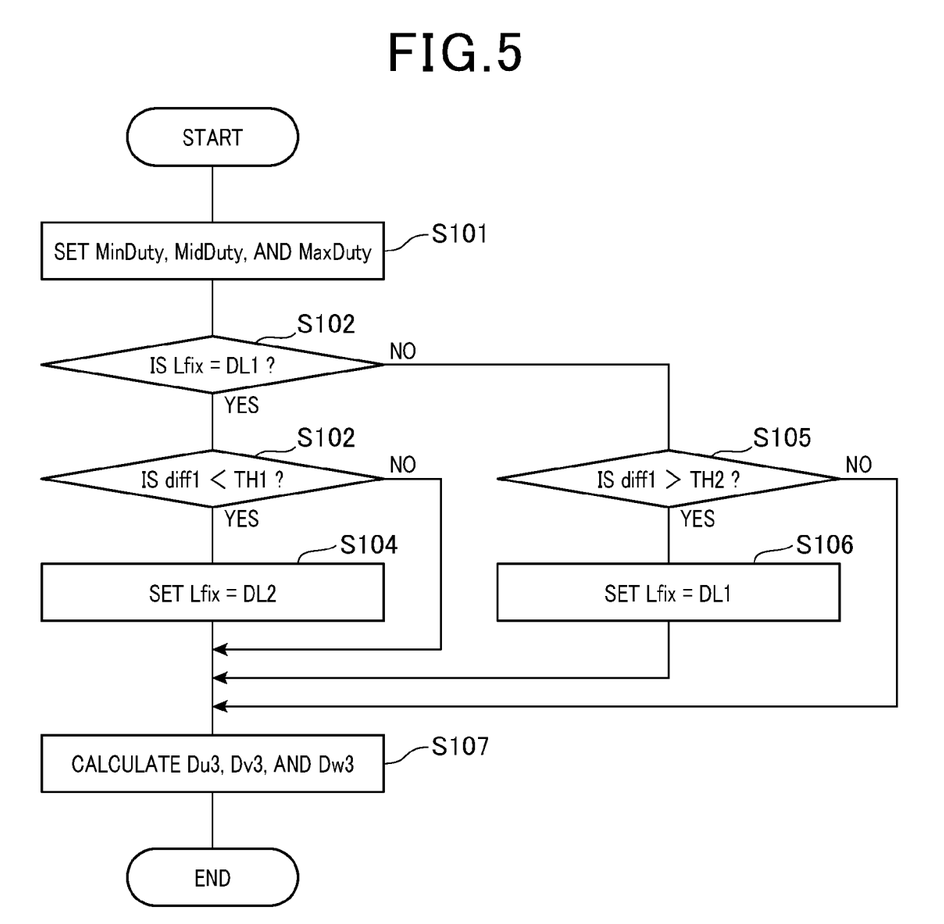
FIG. 5 is a flowchart for explaining a modulation process according to the first embodiment of the present disclosure.

A first S201 is similar to S101 in FIG. 5.

At S202, the modulation processing unit 463 determines whether or not the current upper fixed value Hfix is the first upper limit value DH1. When determined that the current upper fixed value Hfix is not the first upper limit value DH1, that is, the current upper fixed value Hfix is the second upper limit value DH2 (NO at S202), the modulation processing unit 463 proceeds to S205. When determined that the current upper fixed value Hfix is the first upper limit value DH1 (YES at S202), the modulation processing unit 463 proceeds to S203.

At S203, the modulation processing unit 463 determines whether or not the subtraction value diff2 is less than the first determination value TH1. In a manner similar to that according to the above-described embodiment, the first determination value TH1 is a value set based on the dead time. According to the present embodiment, the first determination value TH1 is set to 4%. When determined that the subtraction value diff2 is equal to or greater than the first determination value TH1 (NO at S203), the modulation processing unit 463 proceeds to S207 without changing the upper fixed value Hfix from the first upper limit value DH1. When determined that the subtraction value diff2 is less than the first determination value TH1 (YES at S203), the modulation processing unit 463 proceeds to S204.

At S204, the modulation processing unit 463 switches the upper fixed value Hfix to the second upper limit value DH2.

At S205 to which the modulation processing unit 463 proceeds when determined that the current upper fixed value Hfix is the second upper limit value DH2 (NO at S202), the modulation processing unit 463 determines whether or not the subtraction value diff2 is greater than the second determination value TH2. The second determination value TH2 is set to a predetermined value (such as 8%) that is greater than the first determination value TH1. When determined that the subtraction value diff2 is equal to or less than the second determination value TH2 (NO at S205), the modulation processing unit 463 proceeds to S207 without changing the upper fixed value Hfix from the second upper limit value DH2. When determined that the subtraction value diff2 is greater than the second determination value TH2 (YES at S205), the modulation processing unit 463 proceeds to S206.

At S206, the modulation processing unit 463 switches the upper fixed value Hfix to the first upper limit value DH1.

The process at S207 is similar to S107 in FIG. 5.

According to the present embodiment, the modulation processing unit 463 performs the up-shift process in which the neutral-point voltage is shifted towards the high voltage side such that the maximum duty MaxDuty is the upper fixed value Hfix. The maximum duty MaxDuty is the largest input duty among the input duties Du2, Dv2, and Dw2. The upper fixed value Hfix is the first upper limit value DH1 or the second upper limit value DH2.

According to the present embodiment, the first determination value TH1 related to the switching from the first upper limit value DH1 to the second upper limit value DH2 and the second determination value TH2 related to the switching from the second upper limit value DH2 to the first upper limit value DH1 in the up-shift process are differing values.

The modulation processing unit 463 selects either of the first upper limit value DH1 and the second upper limit value DH2 based on the difference between the input duties Du2, Dv2, and Dw2.

As a result, effects similar to those according to the above-described embodiment are obtained.

According to the present embodiment, the input duties Du2, Dv2, and Dw2 correspond to phase voltage command values. The first upper limit value DH1 corresponds to a first fixed value. The second upper limit value DH2 corresponds to a "second fixed value."

Other Embodiments (A) Modulation Processing Unit

According to the above-described embodiments, the modulation processing unit performs a duty conversion process, a dead-time compensation process, a modulation process, a dead-time adjustment process, and a pseudo duty calculation process in this order. According to another embodiment, the order of the processes may be changed. In addition, at least one of the dead-time compensation process, the dead-time adjustment process, and the pseudo duty calculation process may be omitted.

According to the above-described embodiment, the dead-time adjusting unit adjusts the second smallest duty and the largest duty of the phases instead of the smallest duty of the phases when the lower fixed value is the first lower limit value. According to another embodiment, the dead-time adjusting unit may adjust the smallest duty of the phases when the lower fixed value is the first lower limit value.

According to the above-described embodiments, the modulation processing unit performs the processes using values obtained by the phase voltage command values being converted to duties. According to another embodiment, the modulation processing unit may perform the processes using the phase voltage command values themselves, before the duty conversion. That is, the phase voltage command value is not limited to the input duty according to the above-described embodiments, and may be the phase voltage command value itself or any kind of value including the duty converted from the phase voltage command value and the like.

According to the first embodiment, during the lower flatbed modulation, the modulation processing unit selects the first lower limit value or the second lower limit value, and determines switching between the first lower limit value and the second lower limit value, based on the difference between the middle duty and the minimum duty. According to another embodiment, during the lower flatbed modulation, the modulation processing unit may select the first lower limit value or the second lower limit value, and may determine switching between the first lower limit value and the second lower limit value, based on the difference between the maximum duty and the middle duty or the difference between the maximum duty and the minimum duty, instead of the difference between the middle duty and the minimum duty.

According to the second embodiment, during the upper flatbed modulation, the modulation processing unit selects the first upper limit value or the second upper limit value, and determines switching between the first upper limit value and the second upper limit value, based on the difference between the maximum duty and the middle duty. According to another embodiment, during the upper flatbed modulation, the modulation processing unit may select the first upper limit value or the second upper limit value, and may determine switching between the first upper limit value and the second upper limit value, based on the difference between the middle duty and the minimum duty or the difference between the maximum duty and the minimum duty, instead of the difference between the maximum duty and the middle duty.

(B) Current Detecting Unit

According to the above-described embodiments, the current detecting unit is provided on the low potential side of the inverter unit. According to another embodiment, the current detecting unit may be provided on the high potential side of the inverter unit or may be provided between the inverter unit and the winding set. According to the above-described embodiments, the current detection elements are shunt resistors. According to another embodiment, the current detection element is not limited to the shunt resistor and may be any kind of device, such as a Hall-effect integrated circuit (IC), as long as the device is capable of detecting a phase current.

(C) Rotating Electric Machine

According to the above-described embodiments, a single winding set is provided in the rotating electric machine. According to another embodiment, a plurality of winding sets may be provided in the rotating electric machine. When the plurality of winding sets are provided, a plurality of inverter units corresponding to the number of winding sets may be provided in the power conversion apparatus, and the inverter unit may be provided for each winding set. In addition, the winding sets provided in correspondence with the plurality of inverter units may be used in a single rotating electric machine or a plurality of rotating electric machines.

According to the above-described embodiment, the rotating electric machine is a three-phase brushless motor. According to another embodiment, the rotating electric machine is not limited to a brushless motor and may be any kind of motor. In addition, the rotating electric machine is not limited to a motor and may be a power generator or a so-called motor generator that provides functions of both an electric motor and a power generator.

According to the above-described embodiments, the rotating electric machine is applied to an electric power steering apparatus. According to another embodiment, the rotating electric machine may be applied to an apparatus other than the electric power steering apparatus.

The present disclosure is not limited in any way by the above-described embodiments. Various embodiments are possible without departing from the spirit of the disclosure.

What is claimed is:

1. A power conversion apparatus that converts power of a rotating electric machine including a three-phase winding set, the power conversion apparatus comprising:
    an inverter unit that comprises a plurality of switching elements provided in correspondence to the phases of the winding set; and
    a control unit that is configured to control currents of the winding set by controlling on-off operations of the switching elements by pulse width modulation control, the control unit comprising a modulation processing unit that is configured to perform a modulation process that is a down-shift process or an up-shift process, wherein in the down-shift process, a neutral-point voltage is shifted towards a low voltage side such that a smallest phase voltage command value is a lower fixed value that is a first lower limit value or a second lower limit value, and in the up-shift process, the neutral-point voltage is shifted towards a high voltage side such that a largest phase voltage command value is an upper fixed value that is a first upper limit value or a second upper limit value, wherein
    the modulation processing unit selects either of a first fixed value and a second fixed value based on a difference between the phase voltage command values, the first fixed value being the first lower limit value or the first upper limit value, the second fixed value being the second lower limit value or the second upper limit value, wherein in the modulation process, the first fixed value is switched to the second fixed value based on a first determination value, the second fixed value is switched to the first fixed value based on a second determination value, and the first determination value and the second determination value are differing values.

2. The power conversion apparatus according to claim 1, wherein:
    the modulation processing unit is configured to select either of the first lower limit value and the second lower limit value as the lower fixed value based on the second smallest phase voltage command value and the smallest phase voltage command value when performing the down-shift process.

3. The power conversion apparatus according to claim 2, wherein:
    the second lower limit value is a value greater than the first lower limit value;
    the second determination value is a value greater than the first determination value; and
    the modulation processing unit is configured to:
        switch the lower fixed value from the first lower limit value to the second lower limit value when a subtraction value is less than the first determination value, the subtraction value being a value obtained by the smallest phase voltage command value being subtracted from the second smallest phase voltage command value; and switch the lower fixed value from the second lower limit value to the first lower limit value when the subtraction value is greater than the second determination value.

4. The power conversion apparatus according to claim 3, further comprising:

a current detecting unit that is provided on a low potential side of the inverter unit.

5. The power conversion apparatus according to claim 2, further comprising:

a current detecting unit that is provided on a low potential side of the inverter unit.

6. The power conversion apparatus according to claim 1, further comprising:

a current detecting unit that is provided on a low potential side of the inverter unit.

7. The power conversion apparatus according to claim 1, wherein:

the rotating electric machine is mounted to a vehicle.

* * * * *